June 2, 1953     C. A. DE GIERS     2,640,456
INDICATING INSTRUMENT WITH GEARED POINTER
AND POINTER STOP THEREFOR
Filed Oct. 24, 1950
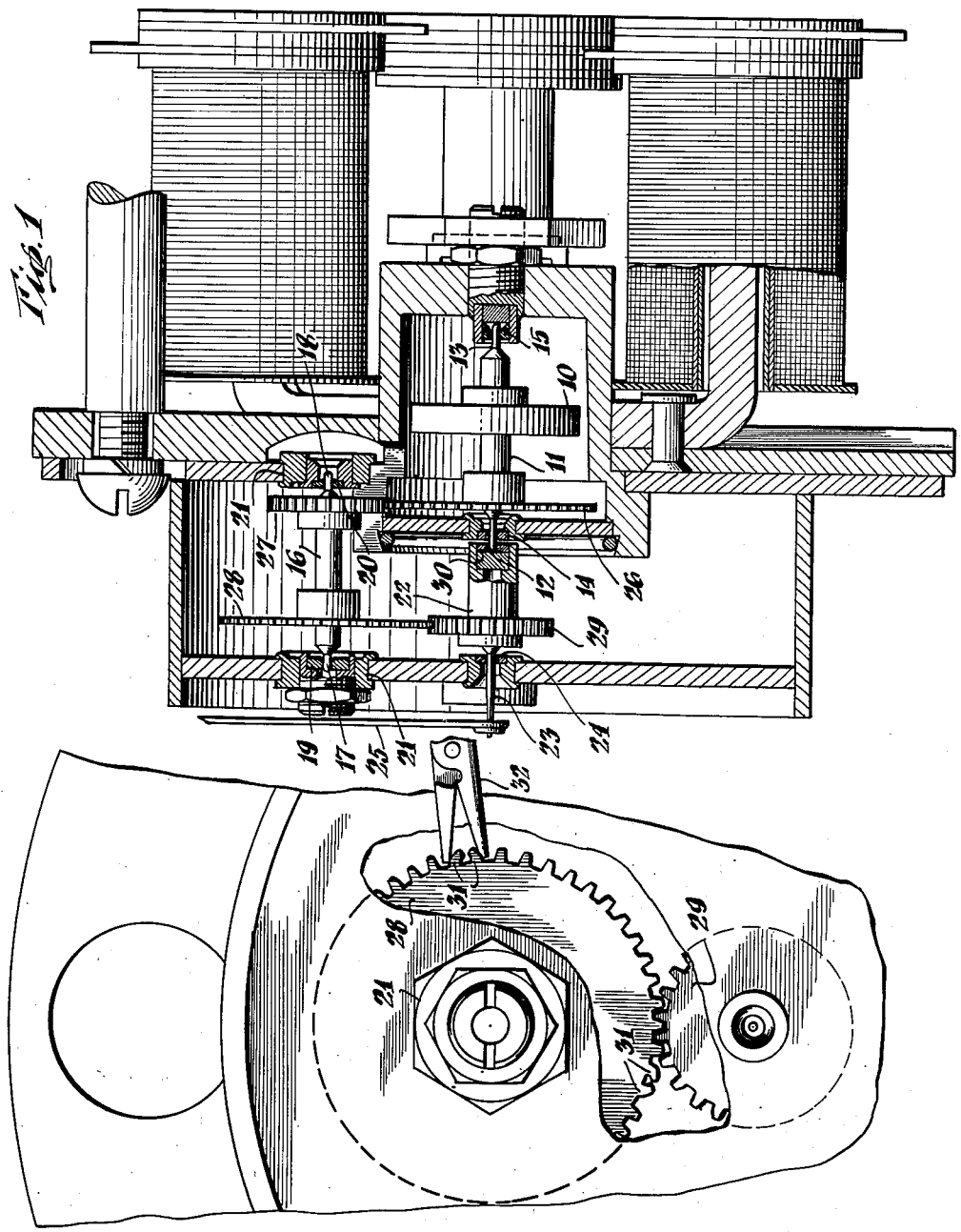
INVENTOR.
Clarence A. de Giers
BY
ATTORNEY Patented June 2, 1953

2,640,456

UNITED STATES PATENT OFFICE 2,640,456

INDICATING INSTRUMENT WITH GEARED POINTER AND POINTER STOP THEREFOR

Clarence A. de Giers, Forest Hills, N. Y., assignor to The Liquidometer Corporation, Long Island City, N. Y., a corporation of Delaware Application October 24, 1950, Serial No. 191,902

1 Claim. (Cl. 116—129)

The present invention relates to indicating instruments and more particularly the provision of means for driving the indicator pointer or like device through movement amplitude changing gearing from the rotor, so as to give an increased or decreased amplitude of sweep of the indicator pointer in respect to the rotor movement, while minimizing friction by a novel disposition and arrangement of anti-friction bearings.

Another feature of the present invention is the provision of a simple method and means for limiting the sweep of the pointer by crimping together adjacent teeth on one of the gears of the driving train which operates the indicator pointer.

A detailed feature of the present invention resides in the provision of an indicating instrument provided with a bearing arrangement comprising a jewel bearing and a cooperating pintle with provision for causing rotation of the jewel bearing in the direction of rotation of the cooperating pintle to the end that friction may be minimized.

Further and other objects and details of the present invention will be set forth in the following specification and will be pointed out in the appended claim. The drawings show, by way of illustration, what I now consider to be a preferred embodiment of the invention.

In the drawings:

Figure 1 is a fragmentary view principally in central longitudinal section of an electrically actuated indicator instrument of the ratiometer type embodying the present invention; and Fig. 2 is a fragmentary view with parts broken away illustrating the manner in which the pointer stops may be provided by crimping together adjacent teeth of one of the gears.

It often happens in ratiometer type instruments, that the actuating mechanisms for the rotor, usually comprising a plurality of deflecting coils, is so arranged that the rotor is given only a predetermined amplitude of movement, for example, a rotation of about 90°. In order that the indication of the instrument may be read accurately, it is sometimes desired that the scale be spread through a large angular amplitude of pointer movement. For this reason it may be desired to provide amplitude multiplying gearing between the rotor and the pointer. Such gearing is shown in Fig. 1 of the accompanying drawings.

Conversely, it is possible that an instrument may be made with a rotor amplitude greater than that desired for the pointer. In such circumstances, an amplitude reducing gear train may be similarly provided. Both such arrangements are to be considered as within the purview of the present invention.

In such a geared instrument, as it may be termed, friction must be minimized in order that the instrument have a desired sensitivity. This is particularly critical in instruments where the torque available to rotate the rotor is small, particularly where only a small rotor movement is called for. The present invention provides a means useful in minimizing this friction.

An instrument constructed in accordance with the present invention comprises a rotor, which, through movement multiplying or amplitude changing gearing, drives a pointer drive shaft. All of the shafts of the gearing or gear train are provided with pintles journaled in jewel bearings. One of the pintles on the rotor shaft extends into cooperation with a jewel bearing on an axially aligned pointer shaft. This latter jewel bearing is mounted to rotate with the pointer shaft. Rotation is effected by the previously mentioned gearing; and the direction of rotation of the rotatable jewel bearing is always in the direction of rotation of the cooperating pintle on the rotor shaft.

Provision is further made whereby suitable selected adjacent teeth on one of the driving gears of the pointer driving train may be crimped together to limit the movement of the pointer.

In the instrument illustrated in the drawings, 10 is a rotor suitably fixed to a rotor shaft 11, which is provided with end pintles 12 and 13 which, in turn, cooperate with suitable jewel bearings 14 and 15, suitably fixed in bushings in the rotor closure plate and rotor housing. 16 is a countershaft provided with similar end pintles 17 and 18 cooperating with jewel bearings 19 and 20 respectively. For adjustment these jewel bearings may be carried in eccentric bushings, such as 21, which is suitably carried by the housing in a fixed but adjustable position. Thus, there is afforded an adjustment by means of which friction losses in the gear train may be minimized.

22 is the indicator or pointer shaft, which is arranged coaxial with the rotor shaft 11 and provided with a pintle 23 extending through a jewel bearing 24 carried in a suitable bushing supported by the dial plate as shown. An indicator or pointer 25 is carried by the end of the pintle 23. A large gear 26 fixed to the rotor shaft 11 meshes with and drives a smaller gear 27 fixed on the countershaft 16. A large gear 28 also fixed on the countershaft 16 meshes with and drives a small gear 29 fixed on the pointer shaft 22. The gear train just described provides increased amplitude of movement for the pointer, while rotating the pointer shaft in either direction. It is further noted that the shaft 22 always rotates in the same direction as the rotor shaft 11.

The inner end of the pointer shaft 22 carries a jewel bearing 30 which cooperates with the extended end of the pintle 12 of the rotor shaft 11. From the foregoing it will be apparent that the jewel bearing 30 always rotates in the same direction as the pintle 12 and thereby minimizes frictional resistance at this point.

To limit the sweep of the pointer, pairs of adjacent teeth such as 31 on the gear 28 may be crimped together by any suitable instrument such as a pair of pliers shown at 32, Fig. 2. Such crimped together teeth serve in lieu of limit stops such as pins for the pointer. This provides an efficient yet inexpensive construction. The particular teeth which are crimped can be selected depending on the sweep of the pointer which is desired. When the crimped together teeth reach the point of enmeshment with the gear 29, they block further movement of the gearing and of the pointer.

While there is herein shown an instrument for multiplying the rotor amplitude, the provision of a gear train by which this amplitude may be proportionately reduced may also embody the features of the present invention. Such a variation will be obvious to those skilled in the art, from the foregoing description.

Furthermore, while the gear 28 has been chosen as the gear which is to be provided with the amplitude-limiting or stop means for the pointer by crimping together adjacent teeth, it will be obvious to those skilled in the art that any gear in the gear train could be provided with crimped-together teeth for this purpose. The present invention is, therefore, to be considered as including such equivalents. All equivalent constructions and methods of forming such constructions are to be included within the scope of the appended claim, which is to be construed validly as broadly as the state of the prior art permits.

What is claimed is:

An indicating instrument having a dial, comprising a pointer shaft carrying a pointer cooperating with said dial and movable thereover, a gear train including a gear element provided with gear teeth and connected to drive said pointer, actuating means for said gear element including a movable element provided with gear teeth meshing with said gear element, and means for limiting the amplitude of movement of said pointer shaft in at least one direction, comprising a selected crimped-together pair of adjacent gear teeth on one of said elements provided with gear teeth.

CLARENCE A. DE GIERS.

References Cited in the file of this patent

UNITED STATES PATENTS

| Number | Name | Date |
|---|---|---|
| 2,137,066 | Smith | Nov. 15, 1938 |
| 2,169,099 | Ketterson | Aug. 8, 1939 |
| 2,313,444 | Lamb | Mar. 9, 1943 |
| 2,401,029 | Thompson | May 28, 1946 |
| 2,542,692 | McCarty et al. | Feb. 20, 1951 |